United States Patent [19]
Ryzhov et al.

[11] 4,113,142
[45] Sep. 12, 1978

[54] DEVICE FOR CONTACTLESS SEPARATION OF INDIVIDUAL FERROMAGNETIC COMPONENTS FROM A FLOW OF COMPONENTS

[76] Inventors: Vladimir Dmitrievich Ryzhov, ulitsa Pushkina, 167, kv. 14; Semen Kirillovich Litvinenko, ulitsa K. Marxa, 28, kv. 15; Roman Samuilovich Leikin, ulitsa Radionova, 18, all of Kurgan; Anton Yanovich Kulberg, prospekt Komarova, 59, kv. 92, Riga; Benyamin Alexandrovich Ioffe, ulitsa Stirnu, 37 a, kv. 44, Riga; Robert Karlovich Kalnin, ulitsa Gorkogo, 53, kv. 19, Riga, all of U.S.S.R.

[21] Appl. No.: 704,693

[22] Filed: Jul. 12, 1976

[30] Foreign Application Priority Data

Jul. 14, 1975 [SU] U.S.S.R. .................. 2155109

[51] Int. Cl.² ................... B23Q 7/18; B65G 35/00
[52] U.S. Cl. ................... 221/171; 198/381; 198/619; 221/212; 310/14; 335/297
[58] Field of Search .......... 198/381, 619, 459, 805; 310/12–14; 221/156, 171, 208, 212; 335/297; 271/18.1, 193, DIG. 3

[56] References Cited
U.S. PATENT DOCUMENTS

| | | | |
|---|---|---|---|
| 3,353,822 | 11/1967 | Dangelmaier | 271/18.1 |
| 3,645,377 | 2/1972 | Zheigur et al. | 198/381 |
| 3,661,241 | 5/1972 | Ioffe et al. | 198/381 |
| 3,661,298 | 5/1972 | Ioffe et al. | 198/381 |
| 3,753,513 | 8/1973 | Grenfell | 221/212 |
| 3,930,212 | 12/1975 | Ioffe et al. | 221/171 |
| 3,989,164 | 11/1976 | Hager | 198/619 |

FOREIGN PATENT DOCUMENTS

| | | | |
|---|---|---|---|
| 1,265,090 | 3/1972 | United Kingdom | 221/171 |
| 1,265,227 | 3/1972 | United Kingdom | 198/381 |

*Primary Examiner*—Evon C. Blunk
*Assistant Examiner*—Jeffrey V. Nase
*Attorney, Agent, or Firm*—Robert E. Burns; Emmanuel J. Lobato; Bruce L. Adams

[57] ABSTRACT

A device for contactless separation of individual ferromagnetic components from a flow of components, comprising a magnet and guards arranged between pole pieces. The guards are made from a non-magnetic material and confine a channel through which components are fed. The gap between the pole pieces is made narrowing in the direction of the component flow. The cross section of at least one pole piece is selected such as to ensure saturation of the magnetic material from which this pole piece is made, when a component being separated from the flow is in the narrowest portion of the pole gap.

2 Claims, 6 Drawing Figures

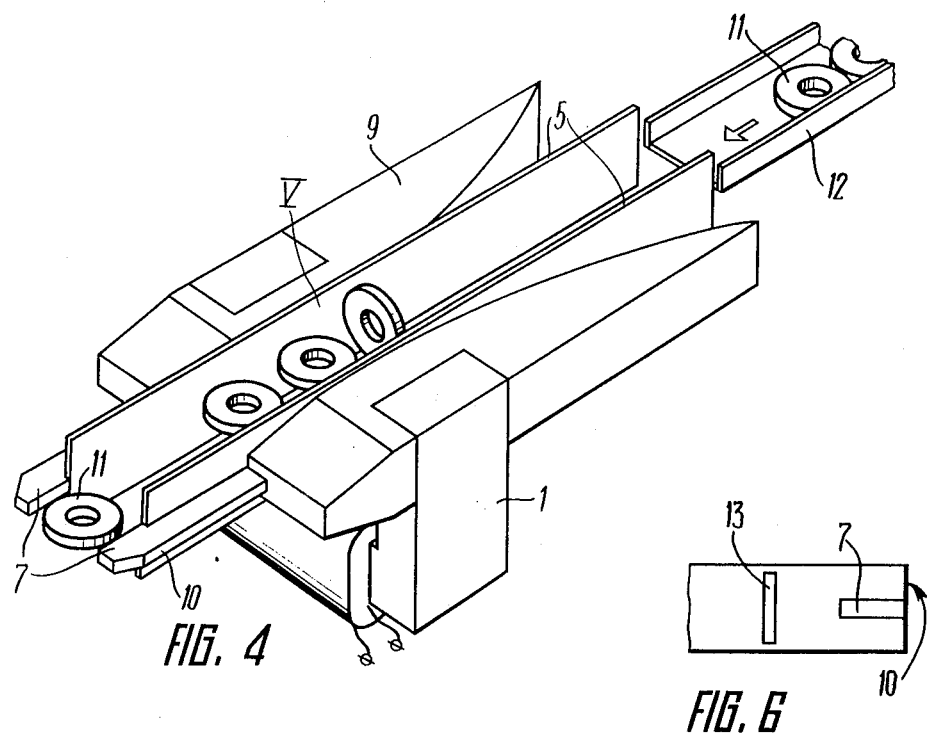
FIG. 4
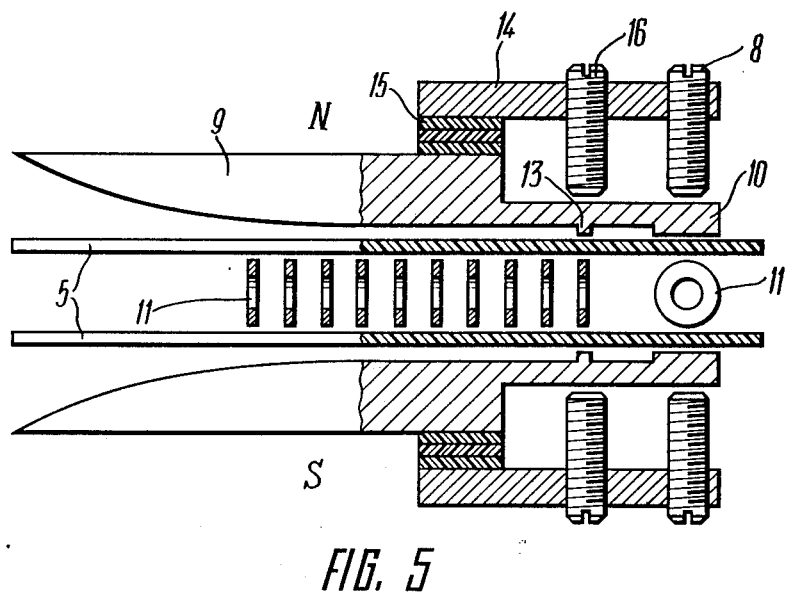
FIG. 6
FIG. 5

DEVICE FOR CONTACTLESS SEPARATION OF INDIVIDUAL FERROMAGNETIC COMPONENTS FROM A FLOW OF COMPONENTS

BACKGROUND OF THE INVENTION

The present invention relates to automation of production processes in instrument making and machine building, and particularly to devices for contactless separation of individual ferromagnetic components from a flow of components.

The herein proposed device can most advantageously be used for regular separation of individual components from a flow of components in cases where components are fed irregularly, for example, by means of vibration trays.

Known in the art are various mechanical devices for separating individual components from a flow of components. The separating mechanisms can be grouped in two categories, as far as their operating principle is concerned: simple action and dual-action mechanisms, and, as far as the motion of their actuating members are concerned: separators with reciprocating and rotative motion. Contact methods of mechanical separation are suitable for regularly shaped components which do not stick together as they are being fed in a flow and which are strong enough not to be deformed as they are being gripped.

It is also known to act upon components with a magnetic field in the separation zone in order both to separate one component in a flow from another and to facilitate their mechanical gripping. In this case, components are separated from one another in the magnetic field, due to their being oppositely polarized.

In particular, there is known a device for contactless separation of individual components from flow of components, comprising a magnet and guards made from a non-magnetic material, arranged between its pole pieces and confining a channel through which the components are fed. In addition to the main magnet for spreading ferromagnetic components stuck together, the device comprises a plurality of additional magnets spaced apart along the channel through which the separated components are fed, as well as a movable plate for delivering a stack of components to this channel. Components, in this case blanks of the rolled steel sheet type, arranged in a stack are placed on the plate and introduced into the pole gap of the main magnet. In this gap, the top blanks acted upon by the magnetic forces are separated from one another (spread) and rest suspended therein. Contactless separation of the uppermost suspended blank is effected by a travelling magnetic field which is maintained by successive energizing of the additional magnets staggered along the path of feed.

This prior art device for contactless separation of ferromagnetic components from a flow (stack) of components has a relatively complex magnetic system and necessitates the use of a special current switching device for the additional magnets. Besides, the position in which each separated component is set relative to the first additional magnet must be strictly observed, which, in turn, necessitates a system for following up the feed of components and maintaining this position.

The known device under consideration requires a transporting means ensuring regular feed of components into the pole gap, and should the flow of components become irregular, the device may become inoperable because faster feeding of components may cause separated components to stick together.

SUMMARY OF THE INVENTION

The principal object of the invention is to provide a device for automatic contactless separation of individual components from a flow of components.

Another object of the invention is to provide a device with means for readjusting it according to different types of components.

Still another object of the invention is to provide a structurally simple and highly reliable device.

These objects are attained by that in a device for contactless separation of individual ferromagnetic components from a flow of components, comprising a magnet and guards made from a non-magnetic material, arranged between its pole pieces and confine a channel through which components are fed, according to the invention, the pole gap is made narrowing in the direction of the component flow, and the cross section of at least one pole piece is selected such as to ensure saturation of the magnetic material from which this pole piece is made, when a component being separated is in the narrowest portion of the pole gap.

To broaden the range of sizes of components to be separated, the device should preferably be provided with an adjustable magnetic shunt positioned on the pole piece with the selected cross section. In this case, the magnetic shunt should preferably be made in the form of a plate arranged parallel to the pole piece and adapted to reciprocate relative thereto.

It is expedient that at least one pole piece have, in the narrowest portion of the pole gap, a lug similar in size to the projection of a component being separated onto the pole piece, and an adjusting screw made from a ferromagnetic material be provided in the plate opposite to the lug, the adjusting screw being adapted to recirocate relative to the lug.

The device according to the present invention ensures rhythmical automatic contactless separation of individual ferromagnetic components through the use of a relatively simple and reliable magnetic system. Rhythmical separation of components with the aid of this device is possible even when the flow of components is irregular. Owing to the use of adjusting means, the device is suitable for a wide range of ferromagnetic components, such as flat, toothed or spring washers of various diameters. Readjustment of this device boils down to changing the channel width and regulation of the magnetizing current, as well as adjustment of the magnetic shunt. The device is relatively compact in size and is easily combined with different devices for feeding a flow of components and transporting the separated components away.

BRIEF DESCRIPTION OF THE DRAWINGS

The invention will now be described in greater detail with reference to specific embodiments thereof, taken in conjunction with the accompanying drawings, wherein:

FIG. 4 is a general isometric view of a device for contactless separation of individual ferromagnetic components of the washer type, according to the invention;

FIG. 5 is a schematic plan view partly in section of a portion of the magnetic system of a device with an adjustable magnetic shunt, according to the invention;

FIG. 6 is a fragmentary view of the pole piece of FIG. 5, as seen from the pole gap.

DESCRIPTION OF THE PREFERRED EMBODIMENT

Figure 1:
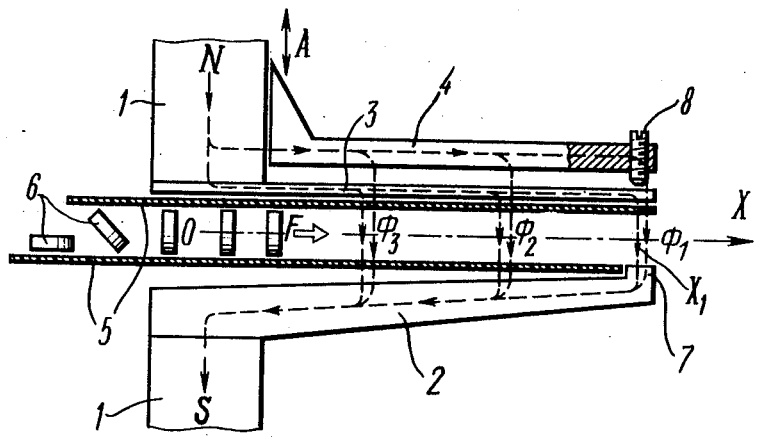
FIG. 1 is a schematic plan view of a portion of the magnetic system of the device according to the invention, showing the distribution of the magnetic flux therein.

FIG. 1 shows schematically a portion of a magnetic system of a device for contactless separation of individual ferromagnetic components from a flow of components, with the closing portion of a magnetic circuit 1 being omitted for clarity. Secured to the magnetic circuit 1 are pole pieces 2 and 3 with a magnetic shunt 4 adapted to reciprocate relative to the pole piece 3. Guards 5 made as straps from a nonmagnetic material are arranged symmetrically in the pole gap along axis OX on either side thereof. The guards 5 confine a channel through which components 6, e.g. rods, are fed. The pole pieces 2 and 3 are arranged so that the pole gap narrows in the direction of flow of components 6, its narrowest portion $X_1$ being near the tips of the pole pieces 2 and 3.

In order to provide for a maximum magnetic field intensity for a separated component to be fixed in the required position, the pole piece 2 is provided with a lug 7 at its end. The lug 7 is similar in size to the projection of a component 6 being separated onto the pole piece 2 and is arranged according to the desired position of the component 6 in the narrowest portion of the pole gap. In what follows, this position of the component 6 will be referred to as the fixed position. The magnetic shunt 4 of the saturable pole piece 3 is made in the form of a plate from a ferromagnetic material and disposed at an adjustable distance from the pole piece 3 parallel thereto. An adjusting screw 8 made from a ferromagnetic material is provided at the end of the shunt 4 opposite to the lug 7 and adapted to reciprocate relative to the latter. Broken lines in FIG. 1 show the distribution of fluxes $\Phi_1$, $\Phi_2$, $\Phi_3$ of the magnetic system.

The pole pieces 2 and 3 are different in cross section, that of the pole piece 3 being selected reduced to ensure saturation of the magnetic material of this pole piece, when the component 6 being separated is in the narrowest portion of the pole gap.

Figure 2:
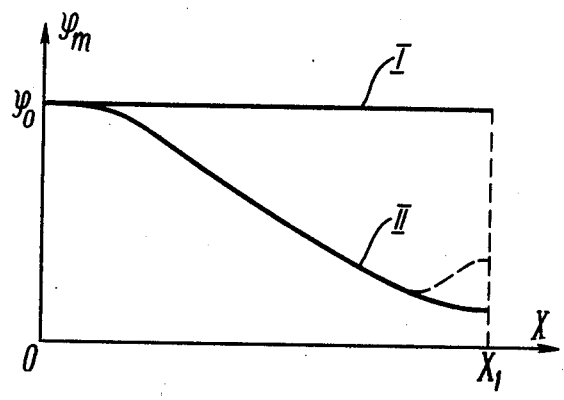
FIG. 2 is a graph showing the distribution of the magnetic potential along the saturable pole piece.

FIG. 2 represents graphs showing the distribution of magnetic potential $\phi_m$ lengthwise the saturable pole piece 3 of the magnetic system shown in FIG. 1. Line I refers to the case where there is no component in position $X_1$, while line II illustrates, approximately, the distribution of potential $\phi_m$ along the pole piece 3 in the presence of a component in position $X_1$. $\phi_o$ is the total magnetic potential of the magnetic circuit 1 (FIG. 1). The broken line shows a variation in the potential distribution caused by the movement of the screw 8.

Figure 3:
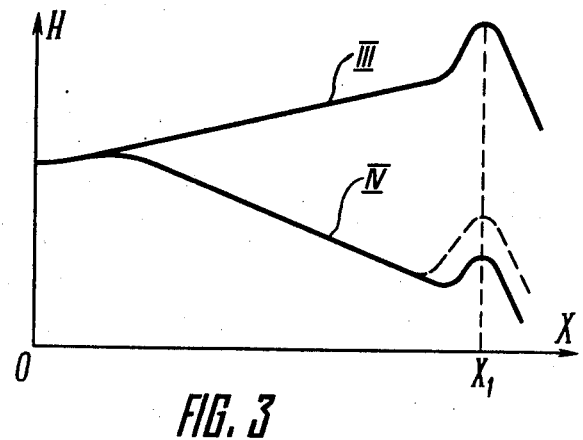
FIG. 3 is a graph showing the distribution of the magnetic flux along the pole gap.

The distribution of magnetic field intensity H in the pole gap of the magnetic system of FIG. 1 is shown in FIG. 3 by lines III and IV for the cases without and with a component in position $X_1$, respectively. The broken line shows, just as in FIG. 2, the redistribution of field intensity H depending on the position of the adjusting screw 8 (FIG. 1).

As the gap between the tip of the adjusting screw 8 and the pole piece 3 is reduced, potential $\phi_m$ (FIG. 2) locally increases, and field intensity H (FIG. 3) in position $X_1$ increases, too.

FIG. 4 is a general isometric view of a device for contactless separation of individual ferromagnetic components of the washer type from a flow of components, having a zone V of magnetic accumulation of components. Secured to the magnetic circuit 1 are massive profiled pole pieces 9 which, in turn, have secured thereto identical separating pole pieces 10 with lugs 7 at their ends. The cross section of the pole pieces 10 is selected such as to ensure saturation of the magnetic material from which they are made, when a component 11 being separated is in the narrowest portion of the pole gap between the lugs 7. The channel through which components (washers) 11 are fed in the pole gap is confined by guards 5 made from a non-magnetic material. A feeder, in this case a vibration tray 12, is provided to deliver a flow of components 11 to the channel entrance.

The device of FIG. 4 is shown without the magnetic shunts encircling the saturable pole pieces 10. This embodiment of the device is suitable for separating components that vary in size but insignificantly.

FIG. 5 is a schematic plan view of another embodiment of the device for separating individual ferromagnetic components of the washer type from a flow of components. Unlike the embodiment shown in FIG. 4, here, in addition to the lugs 7, the pole pieces 10 are provided with lugs 13 similar to the lugs 7 in size and in shape but located at some distance upstream of the lugs 7 and perpendicular thereto in accordance with the projection of components (washers) 11, moving through the pole gap, onto the pole pieces 10. The device also has two adjustable magnetic shunts 14 each being arranged on one of the pole pieces 10. To vary the distance between the magnetic shunts 14 and pole pieces 10 provision is made for shims 15 from a ferromagnetic material. Each shunt 14 is provided with an adjusting screw 8 and 16 made from a ferromagnetic material, arranged opposite to the lugs 7 and 13, respectively. The screws 8 and 16 are adapted to be adjustable axially relative to the lugs 7 and 13.

FIG. 6 in which the pole gap 10 of FIG. 5 is shown as seen from the pole gap illustrates the arrangement of the lugs 7 and 13.

The magnetic system of the device of FIGS. 5 and 6 ensures double separation and reorientation of components 11 of the washer type.

The operating principle of the device for separation of ferromagnetic components can be best explained with reference to FIGS. 1, 2 and 3. Components 6 are delivered through the channel towards the area of action of the magnetic forces of the magnetic circuit 1 by any known means, e.g. a vibration tray. Under the action of magnetic forces, the components 6 are oriented in the beginning of the channel and spread apart. In this case, the first component 6 is acted upon by force F (indicated by an arrow in the drawing), which force accelerates this component 6 along the X axis. The appearance of force F is due to the inhomogeneity of the field in the pole gap (line III in FIG. 3). After the first component 6 reaches fixed position $X_1$, magnetic flux $\Phi_1$ sharply increases owing to the narrower gap, i.e. owing to the proximity of the lug 7 on the pole piece 2 and the presence of the ferromagnetic component 6 in the gap. As this taken place, the magnetic material of the pole piece 3 is saturated. For the material of the pole piece 3 to saturate prior to the arrival of the component 6, its cross section $S_o$ should be selected such as to satisfy condition $S_o < S$, where $$S = \Delta \phi m / R_m B_{max}$$

$\phi_m$ is the magnetic potential difference between the pole pieces of the magnetic system without any component in position $X_1$;

$R_m$ is the reluctance of the magnetic circuit in the gap between the lug 7, component 6 and saturable pole piece 3 (in the presence of a component in position $X_1$);

$B_{max}$ is the saturation induction of the magnetic material of the pole piece 3.

When the material of the pole piece 3 is saturated, the reluctance of the latter sharply increases and total magnetic potential $\phi_o$ drops significantly along this pole piece (line II in FIG. 2). Therewith, intensity H of the magnetic field in the pole gap (line IV in FIG. 3) diminishes accordingly. As a result of such redistribution of the field, the second and following components 6 are not acted upon by the force along the X axis, and the first component 6 becomes separated from the flow of components and fixed by the magnetic forces due to the local inhomogeneity of the field. The force fixing the separated component can be increased by bringing the tip of the adjusting screw 8 closer to the pole piece 3. In this case, magnetic flux $\Phi_1$ closing through the separated component 6 increases (as shown by the broken line in FIGS. 2 and 3). Therewith, the operation of the portions of the pole piece 3, farther removed from fixed position $X_1$, is not disturbed. The initial operating conditions of the magnetic system are restored after the separated component 6 has been removed from fixed position $X_1$ and transported further to its destination.

From the formula of calculation of cross section S of the pole piece it can be inferred that section $S_o$ must be increased when the device is readjusted for operation with larger components (reluctance $R_m$ is reduced). However, instead of readjusting the device, which is inconvenient, the magnetic shunt 4 is simply brought closer to the saturable pole piece 3. In this case, magnetic flux $\Phi_2$, $\Phi_3$ partially closes through the magnetic shunt 4, and the device intended for separating smaller components can as successfully be used for separating larger components.

The operation of the device for contactless separation of individual ferromagnetic components 11 (FIG. 4) can be easily understood from the above description of the operating principle of the magnetic system shown in FIG. 1. The magnetic system of this embodiment being different (the presence of zone V of accumulation of components), makes it possible for this device to accumulate a greater amount of components 11 before the pole pieces 10, which is an essential advantage in cases where the flow of components is irregular. Owing to the larger zone V of magnetic accumulation of components, it becomes possible to regularly transport the separated components 11 when the device is fed from vibration trays or other feeding means (not shown) with probabilistic feed of components. Owing to the above configuration and arrangement of the lugs 7 on the pole pieces 10, components 11 between the lugs 7 are fixed in an oriented position so that their plane is an extention of the plane of the lugs 7.

The operation of another embodiment similar in purpose, shown in FIGS. 5 and 6, differs from the previously described one in that the separation of components 11 is effected in two stages. At the first stage, components 11 are oriented perpendicularly to the axis of their movement by means of the lugs 13 and adjusting screws 16, and at the second stage, the components are reoriented, being turned through an angle of 90°, by means of the lugs 7 and adjusting screws 8, as is shown in FIG. 5. The magnetic system embployed for two-stage separation of components provides for a more reliable fixation of the separated components 11 in the oriented position even when the pressure exerted by the following components is increased and varies within a wide range.

What is claimed is:

1. Apparatus for contactless separation of magnetizable components along a given path comprising, two elongated polepieces of opposite polarity for developing a magnetic field when energized and disposed opposite each other defining a channel therebetween along which magnetizable components move in a flow in the channel, two elongated, non-magnetic guards between the polepieces defining the path along with said components travel in said channel, said polepieces having a configuration defining the channel as a progressively narrowing channel in the direction of travel of said components in said flow, and developing a magnetic field of increasing intensity in the direction of travel of said components, one of said polepieces having a projection extending inwardly toward the channel and saturable with flux thereby to abruptly increase the intensity of a magnetic field developed by said polepieces at a narrowest point of said channel to accelerate a leading one of the components into a position separate from the other components in said flow, and two opposed magnetic shunts parallel with each other and adjustabe axially toward and away from said channel at points aligned with said projection thereby to increase the intensity of said magnetic field at said narrowest point of said channel.

2. Apparatus for contactless separation of magnetizable components along a given path according to claim 1, in which said polepieces include opposed projections extending into said channel upstream of said one projection and oriented relative to said one projection for positioning the individual components 90° vertically from their initial position of travel along said path, and including adjusting screws on said shunts adjustable axially toward and away from said opposed projections and aligned axially therewith to vary the magnetic field at said opposed projections.

* * * * *